United States Patent
Bao et al.

(10) Patent No.: US 10,005,070 B2
(45) Date of Patent: Jun. 26, 2018

(54) BIMETALLIC MERCAPTAN CONVERSION CATALYST FOR SWEETENING LIQUEFIED PETROLEUM GAS AT LOW TEMPERATURE

(71) Applicants: China National Petroleum Corporation, Beijing (CN); China University of Petroleum-Beijing, Beijing (CN); Beijing CUP Green Catalytic Technology CO., LTD., Beijing (CN)

(72) Inventors: Xiaojun Bao, Beijing (CN); Deqi Huang, Beijing (CN); Ming Ke, Beijing (CN); Lei Wang, Beijing (CN); Pei Yuan, Beijing (CN); Gang Shi, Beijing (CN)

(73) Assignees: CHINA NATIONAL PETROLEUM CORPORATION, Beijing (CN); CHINA UNIVERSITY OF PETROLEUM-BEIJING, Beijing (CN); BEIJING CUP GREEN CATALYTIC TECHNOLOGY CO., LTD., Beijing (CN)

( * ) Notice: Subject to any disclaimer, the term of this patent is extended or adjusted under 35 U.S.C. 154(b) by 58 days.

(21) Appl. No.: 15/077,431

(22) Filed: Mar. 22, 2016

(65) Prior Publication Data

US 2016/0199819 A1 Jul. 14, 2016

Related U.S. Application Data

(63) Continuation of application No. PCT/CN2014/085315, filed on Aug. 27, 2014.

(51) Int. Cl.

| | |
|---|---|
| *B01J 37/00* | (2006.01) |
| *C10G 29/04* | (2006.01) |
| *B01J 23/847* | (2006.01) |
| *B01J 37/02* | (2006.01) |
| *B01J 37/04* | (2006.01) |
| *B01J 37/08* | (2006.01) |

(52) U.S. Cl.
CPC ......... *B01J 23/8472* (2013.01); *B01J 23/847* (2013.01); *B01J 37/0027* (2013.01); *B01J 37/0207* (2013.01); *B01J 37/0236* (2013.01); *B01J 37/04* (2013.01); *B01J 37/08* (2013.01); *C10G 29/04* (2013.01); *C10G 2300/202* (2013.01)

(58) Field of Classification Search
CPC ...... B01J 23/755; B01J 23/8472; C10G 29/04
See application file for complete search history.

(56) References Cited

U.S. PATENT DOCUMENTS

| | | | |
|---|---|---|---|
| 2,882,224 A | 4/1959 | Gleim et al. | |
| 2,988,500 A | 6/1961 | Gleim et al. | |
| 3,108,081 A | 10/1963 | Gleim et al. | |
| 4,049,572 A | 9/1977 | Douglas | |
| 5,395,511 A * | 3/1995 | Kubo | C10G 47/34 208/107 |
| 5,510,568 A | 4/1996 | Hearn | |
| 5,851,383 A | 12/1998 | Frey | |
| 6,893,553 B1 * | 5/2005 | Abe | B01J 23/85 208/111.3 |
| 2005/0133419 A1* | 6/2005 | Long | C10G 11/05 208/120.01 |
| 2009/0139898 A1* | 6/2009 | Long | B01J 23/002 208/46 |
| 2011/0042270 A1* | 2/2011 | Guillon | B01J 29/04 208/118 |
| 2015/0368569 A1* | 12/2015 | Hayasaka | C10G 45/64 208/60 |

FOREIGN PATENT DOCUMENTS

| | | |
|---|---|---|
| CN | 1706549 A | 12/2005 |
| CN | 101618313 A | 1/2010 |
| CN | 101619231 A | 1/2010 |
| CN | 102020729 A | 4/2011 |

OTHER PUBLICATIONS

International Search Report dated Jun. 3, 2015 for PCT application No. PCT/CN2014/085315.

* cited by examiner

*Primary Examiner* — Jun Li
(74) *Attorney, Agent, or Firm* — Ohlandt, Greeley, Ruggiero & Perle, LLP

(57) ABSTRACT

The present invention relates to a bimetallic mercaptan conversion catalyst for sweetening liquefied petroleum gas at a low temperature, which is prepared by using an $Al_2O_3$—$SiO_2$ composite oxide as a carrier to support bimetallic active components vanadium and nickel. The bimetallic mercaptan conversion catalyst has a proper specific surface area and more metal active center sites, and has advantages of simple preparation, an efficient mercaptan conversion ability even at a low temperature, and causing no saturation and polymerization of olefins. The bimetallic mercaptan conversion catalyst exhibits superior mercaptan conversion performance in LPG sweetening, has strong adaptability to starting materials, and can also nearly completely remove trace carbonyl sulfide contained in LPG.

10 Claims, No Drawings

# BIMETALLIC MERCAPTAN CONVERSION CATALYST FOR SWEETENING LIQUEFIED PETROLEUM GAS AT LOW TEMPERATURE

TECHNICAL FIELD

The present invention relates to a bimetallic mercaptan conversion catalyst for sweetening liquefied petroleum gas at a low temperature, and to a method for preparing the same, which belong to the technical field of petrochemical industry.

BACKGROUND ART

Liquefied Petroleum Gas (LPG), as one of the important petroleum products produced by oil catalytic cracking apparatuses, contains a large quantity of propylene and C4-olefins, and can be separated and purified for use as a starting material for producing polyolefins as well as a starting material for etherification and alkylation processes for producing a blending component of a high-octane clean gasoline. However, LPG produced by catalytic cracking apparatuses contains an amount of sulfides as impurities, which may affect its subsequent processing and utilization. In particular, mercaptans contained in LPG (mainly methyl mercaptan and trace ethyl mercaptan) are toxic, malodorous and weakly acidic, and tend to cause corrosion of facilities and catalyst poisoning in the post-processing units. Accordingly, LPG sweetening has been necessary.

The first widely-used LPG-sweetening technique is sweetening by catalytic oxidation, developed by Universal Oil Products (UOP) Company. The company disclosed the method in U.S. Pat. No. 2,882,224 in as early as 1958, now known as the Merox liquid-liquid extraction and oxidation sweetening process. The sulfonated cobalt phthalocyanine or poly(cobalt phthalocyanine) catalyst used specially for this process can promote oxidation of the thiolate ions, as extracted with an alkaline solution, by the oxygen in air to produce a disulfide, which can subsequently be separated so that the purpose of removing mercaptans from LPG can be achieved. The sulfonated cobalt phthalocyanine catalyst in the process is used while dissolved in the alkaline solution, and thus easy to be deactivated due to aggregation. Therefore, it is necessary to continuously inject fresh alkaline solutions, which results in a short cycle period of the alkaline solution and large emission of waste alkaline solutions, bringing tremendous pressure on environmental protection.

As regards the sweetening by catalytic oxidation, UOP has been committing itself to improving the stability of the catalyst, and reducing or avoiding use of caustic alkali to prevent environmental pollution. The technical solutions disclosed in U.S. Pat. Nos. 2,988,500, 3,108,081 and 4,049,572 were a series of improvements made by UOP to the catalytic oxidation sweetening process and the catalyst. However, a small amount of alkaline solution or alkaline aids are still necessarily used in the sweetening process of the methods disclosed in these patents, which is still disadvantageous to environmental protection.

CN1706549A relates to a double-effect catalyst and its preparation method, wherein the catalyst is a solid formed article having a manganese compound as an active component and showing catalytic activity in both t-butyl hydroperoxide decomposition and mercaptan conversion. The double-effect catalyst can reduce the mercaptan sulfur in LPG to 0.1 μg/g or less. However, since t-butyl hydroperoxide serves as an oxygenating agent, it not only provides reactive oxygen species upon decomposition, but also produces isobutanol and leaves it in the LPG product, thereby increasing the cost for subsequent separation and purification.

Due to the above defects present in the catalytic oxidation method, an etherification sweetening method was developed later on. The etherification sweetening technique has been used in the sweetening process for a catalytic cracking gasoline in a plant by virtue of its advantages such as a mild reaction condition, small energy consumption, no pollution, and a high mercaptan removal rate. This method uses active olefins in a gasoline fraction to react with mercaptans having a low molecular weight to produce a thioether compound having a high boiling point, so that the low-molecular-weight mercaptan can be transferred from the light gasoline fraction to the heavy gasoline fraction so as to achieve the purpose of removal of mercaptans from the light gasoline fraction, wherein the mercaptan conversion catalyst is a key factor of the technique.

Currently, most mercaptan conversion catalysts use well-developed catalysts in other hydrotreatment processes, which have transition metals as the major active component supported on an inert carrier such as $Al_2O_3$ and $SiO_2$ for use. U.S. Pat. No. 5,510,568, owned by Chemical Research & Licensing Ltd., discloses a process for removing mercaptans and hydrogen sulfide from cracked naphtha, in which the catalytic distillation column was loaded with supported $Pd/Al_2O_3$, which can catalyze the reaction of hydrogen sulfide and low-molecular-weight mercaptans with dienes in the naphtha to produce a heavier sulfocompound, which was further transferred into the C6+ fraction, so that a sulfur-free light naphtha component was obtained from the top of the reaction distillation column. The catalyst had a Pd load of 0.27-0.33 wt %. The starting materials for this reaction had a mercaptan content of 100,000 ppm and a diene content of 0.254 wt %, and were reacted and distilled at 265° F. in the catalyst bed. After the reaction, the light naphtha fraction as an outflow from the top of the reaction distillation column had a mercaptan content of 6,000 ppm and a reduced diene content of 0.001 wt %. However, the $Pd/Al_2O_3$ catalyst requires a high operational temperature, and may easily cause saturation and polymerization of the active unsaturated olefins in LPG if used for LPG mercaptan conversion. Moreover, the catalyst is present in a hydrogenated form during the reaction, and thus it is necessary to inject a large quantity of hydrogen gas into the reactor to keep $Pd/Al_2O_3$ in an activated state; and the reduced Pd-based catalyst is also sensitive to sulfides in the starting materials, and thus a high sulfur content may cause deactivation and poisoning of $Pd/Al_2O_3$, which affect its performance in mercaptan removal and dienes removal by hydrogenation.

Since nickel as a transition metal has strong hydrogenation activity and sulfur-poisoning resistance and lower production cost than the noble metal palladium, it has been widely applied in hydrogen desulfurization. U.S. Pat. No. 5,851,383 discloses a process for mercaptan removal by thioetherification of light hydrocarbons and diene removal by selective hydrogenation, in which a supported monometallic $Ni/Al_2O_3$ catalyst, which had an elemental Ni content of 15-35 wt % and can catalyze both thioetherification of mercaptans and olefins and selective hydrogenation of dienes, was loaded in a fixed bed reactor. The starting materials containing mercaptans and dienes were contacted with the $Ni/Al_2O_3$ in the fixed bed reactor, and operated at a temperature of 125° C. and pressure of 4.1 MPa. After the reaction, the product was further split via a rectifying column to obtain a light component having a mercaptan removal rate of 100% and a dibutene removal rate of 99%. However, this patent does not disclose a method for preparing the catalyst and the physical-chemical properties of the catalyst. In addition, the nickel-based catalyst required a high reaction temperature, which may easily cause polymerization of the active unsaturated hydrocarbons in the starting materials.

LPG contains a large quantity of highly reactive olefins which are easily saturated and polymerized at a high temperature. Thus, saturation and polymerization of these olefins can be avoided and the energy consumption can be reduced if when the operation is conducted at a low temperature. Therefore, it may be very necessary to develop a mercaptan conversion catalyst which has high activity and high stability at a low temperature.

SUMMARY OF THE INVENTION

In order to solve the above technical problems, the present invention aims at providing a bimetallic mercaptan conversion catalyst for sweetening liquefied petroleum gas at a low temperature and a method for preparing the same. The catalyst can achieve mercaptan conversion at a low temperature to efficiently remove mercaptans without causing saturation and polymerization of olefins.

To achieve the above purpose, the present invention provides a method for preparing a bimetallic mercaptan conversion catalyst for sweetening liquefied petroleum gas at a low temperature, comprising steps of:

(1) mixing 60-80 parts by mass of aluminum hydroxide xerogel and 20-40 parts by mass of silica xerogel uniformly, adding thereto a pore-forming agent and an aqueous nitric acid solution, followed by mixing and kneading, and then extruding the resultant to produce a formed article;

(2) air-drying the formed article by placing it at room temperature for 8-15 hours, drying it at 90-120° C. for 3-5 hours, then calcinating it for 3-8 hours by elevating the temperature to 450-620° C. at a heating rate of 2-4° C./min, and subsequently crushing and screening the resultant to produce short-rod-like particles having a size of 4-6 mm, thereby producing an $Al_2O_3$—$SiO_2$ composite oxide carrier; and (3) loading bimetallic active components, vanadium and nickel, separately onto the $Al_2O_3$—$SiO_2$ composite oxide carrier by using an isometric impregnation method, and then drying and calcinating it to obtain the bimetallic mercaptan conversion catalyst for sweetening liquefied petroleum gas at a low temperature.

In the above preparation method, preferably, in step (1) the pore-forming agent is used in an amount of 3-5 wt % with respect to the total mass of the mixture of the aluminum hydroxide xerogel and the silica xerogel, the aqueous nitric acid solution is used in an amount of 70-80 wt % with respect to the total mass of the mixture of the aluminum hydroxide xerogel and the silica xerogel, and the aqueous nitric acid solution has a concentration of 5-10 wt %, on a mass percentage basis.

In the above preparation method, preferably, the $Al_2O_3$—$SiO_2$ composite oxide carrier has a specific surface area of 150-330 $m^2$/g and a pore size of 4-12 nm.

In the above preparation method, preferably, step (3) further comprises:

i) adding a solution containing a soluble salt of vanadium dropwise onto the $Al_2O_3$—$SiO_2$ composite oxide carrier, then allowing it to age by placing it at room temperature for 6-12 hours, drying it at 90-120° C. for 3-5 hours, and calcinating it at 420-550° C. for 3-6 hours, so as to obtain a catalyst intermediate; and ii) adding a solution containing a soluble salt of nickel dropwise onto the catalyst intermediate, then allowing it to age by placing it at room temperature for 6-12 hours, drying it at 90-120° C. for 3-5 hours, and calcinating it at 420-550° C. for 3-6 hours, so as to obtain the bimetallic mercaptan conversion catalyst for sweetening liquefied petroleum gas at a low temperature.

In step (3), after adding the solution containing a soluble salt of vanadium/nickel dropwise onto the carrier/intermediate, stirring is continuously performed to mix uniformly the impregnation solution and the carrier/intermediate.

In the above preparation method, preferably, the soluble salt of vanadium includes one or a combination of more of ammonium metavanadate, sodium metavanadate, potassium metavanadate, vanadium acetylacetonate and sodium orthovanadate.

In the above preparation method, preferably, the soluble salt of nickel includes one or a combination of more of nickel nitrate, nickel chloride, nickel sulfate, nickel acetate, nickel oxalate and nickel acetylacetonate.

In the above preparation method, preferably, the total content of the bimetallic active components, measured on the basis of the weight of oxides, is 10-40 wt %, more preferably 12-30 wt %, of the bimetallic mercaptan conversion catalyst for sweetening liquefied petroleum gas at a low temperature.

In the above preparation method, preferably, the molar ratio of vanadium to nickel is (0.1-0.8):1.

In the preparation process, the concentrations of the solution containing a soluble salt of vanadium and the solution containing a soluble salt of nickel may be adjusted according to the above content in mass percentage and the molar ratio.

In the above preparation method, preferably, in step (1), the extruded formed article is a clover-shaped long-rod-like formed article having a diameter of 1-3 mm, or a cylindrical long-rod-like formed article having a diameter of 1-3 mm, wherein the terms "clover-shaped" and "cylindrical" refer to the shape of the cross section.

In the above preparation method, the pore forming agent used may be a frequently used pore forming agent in the art, preferably sesbania powder.

The present invention also provides a bimetallic mercaptan conversion catalyst for sweetening liquefied petroleum gas at a low temperature, which is prepared by the above preparation method.

The present invention also provides use of said bimetallic mercaptan conversion catalyst for sweetening liquefied petroleum gas at a low temperature in low-temperature sweetening treatment of liquefied petroleum gas.

According to a specific embodiment of the present invention, preferably, when using the bimetallic mercaptan conversion catalyst provided in the present invention to perform low-temperature sweetening treatment of liquefied petroleum gas, the sweetening treatment is carried out at a reaction temperature of 55-150° C., a reaction pressure of 1.0-4.0 MPa, a liquid volume hourly space velocity of 2-6 $h^{-1}$, and a volume ratio of hydrogen gas to liquefied petroleum gas of 2-8:1.

Upon calcination, the active metals are deposited in an oxidized form on the carrier. Preferably, prior to use, the bimetallic mercaptan conversion catalyst is subjected to pre-sulfidation in which sulfur-containing hydrocarbons are used to convert the active metal oxides into their metal sulfide form, and the sulfur-containing hydrocarbons are mixed gas of hydrogen gas and hydrogen sulfide containing 6-10 wt % of hydrogen sulfide, or a naphtha fraction containing 1-4 wt % of carbon disulfide or dimethyl disulfide.

According to a specific embodiment of the present invention, the sulfidation described above may be carried out in a hydrodesulfurization reactor, preferably, at a pre-sulfidation temperature of 270-450° C.

The bimetallic mercaptan conversion catalyst prepared according to the preparation method provided according to the present invention has a proper specific surface area and more metal active sites, and has advantages of simple preparation, efficient mercaptan conversion ability even at a low temperature, and causing no saturation and polymerization of olefins. Moreover, the bimetallic mercaptan conversion catalyst exhibits superior mercaptan conversion performance in LPG sweetening, has strong adaptability to starting materials, and can also nearly completely remove trace carbonyl sulfide contained in LPG. The catalyst provided according to the present invention has prominent low-temperature catalytic activity and good catalytic stability, as compared to catalysts in the prior art.

DETAILED DESCRIPTION OF PREFERRED EMBODIMENTS

The technical solutions of the present invention will now be further described in details in order to provide a clearer understanding of the technical features, purposes and advantageous effects of the present invention, while the description is not to be construed as limitations to the implementable scope of the present invention.

EXAMPLE 1

This Example provides a bimetallic mercaptan conversion catalyst which was prepared by steps of:

(1) mixing 30 g of aluminum hydroxide xerogel and 20 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the cylindrical formed article produced in step (1) by placing it at room temperature for 14 hours, drying it at 100° C. for 5 hours, then calcinating it for 6 hours by elevating the temperature to 480° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 2.64 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 430° C. at a heating rate of 2° C./min, to obtain a catalyst intermediate;

weighing out 13.98 g of nickel nitrate hexahydrate and dissolving it in 16.0 g of deionized water to formulate a solution of nickel nitrate, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 430° C. for 4 hours, to obtain the bimetallic mercaptan conversion catalyst A.

EXAMPLE 2

This Example provides a bimetallic mercaptan conversion catalyst which was prepared by steps of:

(1) mixing 35 g of aluminum hydroxide xerogel and 15 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 2.64 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min, to obtain a catalyst intermediate;

weighing out 13.98 g of nickel nitrate hexahydrate and dissolving it in 16.0 g of deionized water to formulate a solution of nickel nitrate, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 480° C. for 4 hours, to obtain the bimetallic mercaptan conversion catalyst B.

EXAMPLE 3

This Example provides a bimetallic mercaptan conversion catalyst which was prepared by steps of:

(1) mixing 40 g of aluminum hydroxide xerogel and 10 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 560° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 2.64 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 520° C. at a heating rate of 2° C./min to obtain a catalyst intermediate;

weighing out 13.98 g of nickel nitrate hexahydrate and dissolving it in 16.0 g of deionized water to formulate a solution of nickel nitrate, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 520° C. for 4 hours, to obtain the bimetallic mercaptan conversion catalyst C.

EXAMPLE 4

This Example provides a bimetallic mercaptan conversion catalyst which was prepared by steps of:

(1) mixing 35 g of aluminum hydroxide xerogel and 15 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 1.17 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min to obtain a catalyst intermediate;

weighing out 7.08 g of nickel nitrate hexahydrate and dissolving it in 16.0 g of deionized water to formulate a solution of nickel nitrate, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 480° C. for 4 hours, to obtain the bimetallic mercaptan conversion catalyst D.

EXAMPLE 5

This Example provides a bimetallic mercaptan conversion catalyst which was prepared by steps of:

(1) mixing 35 g of aluminum hydroxide xerogel and 15 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 3.96 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min to obtain a catalyst intermediate;

weighing out 9.98 g of nickel nitrate hexahydrate and dissolving it in 16.0 g of deionized water to formulate a solution of nickel nitrate, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 480° C. for 4 hours, to obtain the bimetallic mercaptan conversion catalyst E.

EXAMPLE 6

This Example provides a bimetallic mercaptan conversion catalyst which was prepared by steps of:

(1) mixing 35 g of aluminum hydroxide xerogel and 15 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 3.47 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min to obtain a catalyst intermediate;

weighing out 16.83 g of nickel nitrate hexahydrate and dissolving it in 16.0 g of deionized water to formulate a solution of nickel nitrate, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 480° C. for 4 hours, to obtain the bimetallic mercaptan conversion catalyst F.

EXAMPLE 7

This Example provides a bimetallic mercaptan conversion catalyst which was prepared by steps of:

(1) mixing 35 g of aluminum hydroxide xerogel and 15 g of silica xerogel uniformly, then adding 2 g of sesbania powder into the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 2.75 g of sodium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min to obtain a catalyst intermediate;

weighing out 11.42 g of nickel chloride hexahydrate and dissolving it in 16.0 g of deionized water to formulate a solution of nickel chloride, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 480° C. for 4 hours, to obtain the bimetallic mercaptan conversion catalyst G.

EXAMPLE 8

This Example provides a bimetallic mercaptan conversion catalyst which was prepared by steps of:

(1) mixing 35 g of aluminum hydroxide xerogel and 15 g of silica xerogel uniformly, then adding 2 g of sesbania powder into the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) separately loading bimetallic active components, vanadium and nickel, by using an isometric impregnation method, comprising:

weighing out 1.32 g of ammonium metavanadate and 1.56 g of potassium metavanadate and dissolving them in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min to obtain a catalyst intermediate;

weighing out 5.71 g of nickel chloride hexahydrate and 5.98 g of nickel acetate tetrahydrate and dissolving them in 16.0 g of deionized water to formulate a solution containing nickel, adding the solution slowly onto the catalyst intermediate under continuous stirring to mix the impregnation solution and the intermediate uniformly, then placing it at room temperature for 12 hours, subsequently drying it at 120° C. for 4 hours, and finally calcinating it at 480° C. for 4 hours, to obtain the bimetallic mercaptan conversion catalyst H.

COMPARATIVE EXAMPLE 1

This Example provides a catalyst which was prepared by steps of:

(1) adding 2 g of sesbania powder to 50 g of aluminum hydroxide xerogel and mixing them uniformly, further adding dropwise 37.5 g of an aqueous nitric acid solution having a concentration of 5 wt % and kneading it with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$ carrier;

(3) separately loading bimetallic active components, vanadium and nickel, by using an isometric impregnation method, comprising:

weighing out 2.64 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$ carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min to obtain a catalyst intermediate;

weighing out 13.98 g of nickel nitrate hexahydrate and dissolving it in 16.0 g of deionized water to formulate a solution of nickel nitrate, adding the solution slowly dropwise onto the catalyst intermediate under continuous stirring to mix the impregnation solution and the intermediate uniformly, then placing it at room temperature for 12 hours, subsequently drying it at 120° C. for 4 hours, and finally calcinating it at 480° C. for 4 hours, to obtain the catalyst I.

COMPARATIVE EXAMPLE 2

This Example provides a catalyst which was prepared by steps of:

(1) mixing 35 g of aluminum hydroxide xerogel and 15 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) loading the bimetallic active component vanadium by using an isometric impregnation method, comprising:

weighing out 2.24 g of ammonium metavanadate and dissolving it in 16.0 g of an oxalic acid solution having a concentration of 20 wt % to formulate a solution containing the active metal vanadium, adding the solution slowly dropwise onto 20 g of the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it for 4 hours in a muffle furnace by elevating the temperature to 480° C. at a heating rate of 2° C./min, to obtain the catalyst J.

COMPARATIVE EXAMPLE 3

This Example provides a catalyst which was prepared by steps of:

(1) mixing 35 g of aluminum hydroxide xerogel and 15 g of silica xerogel uniformly, then adding 2 g of sesbania powder to the resultant mixture and mixing them uniformly, further adding dropwise 37.5 g of an aqueous nitric acid solution having a concentration of 5 wt % and kneading it uniformly with the mixture, and forming a cylindrical formed article having a diameter of 3 mm by an extruder;

(2) air-drying the extruded formed article produced in step (1) by placing it at room temperature for 14 hours, drying it at 100° C. for 5 hours, then calcinating it for 4 hours by elevating the temperature to 520° C. at a heating rate of 2° C./min, and subsequently crushing and screening the resultant to produce short-rod-like particles having a size of about 5 mm, thereby producing an $Al_2O_3$—$SiO_2$ composite oxide carrier;

(3) loading the bimetallic active component nickel by using an isometric impregnation method, comprising:

weighing out 12.67 g of nickel nitrate hexahydrate and dissolving it in 16.0 g of deionized water to formulate a solution of nickel nitrate, adding the solution slowly dropwise onto the $Al_2O_3$—$SiO_2$ composite oxide carrier produced above under continuous stirring to mix the impregnation solution and the carrier uniformly, then placing it at room temperature for 12 hours, subsequently drying it at 120° C. for 4 hours, and finally calcinating it at 480° C. for 4 hours, to obtain the catalyst K.

The catalysts A to K as produced by the above Examples and Comparative Examples were evaluated by using a micro fixed bed reactor, in which the loading amount of catalyst was 4.0 g, and both ends of the bed were filled with quartz sand when the catalyst was loaded.

Prior to the reaction, the catalysts need pre-sulfidation, in which straight-run gasoline was used as the pre-sulfidation oil, $CS_2$ was used as the sulfidation agent at a concentration of 2.0 wt % in the straight-run gasoline (on a mass percentage basis), the pre-sulfidation oil was run under a volume hourly space velocity of 1.5 $h^{-1}$, the pre-sulfidation pressure was 2.0 MPa, and the volume ratio of hydrogen to oil was 250. The pre-sulfidation process was as follows: performing sulfidation at 230° C. for 3 h, at 270° C. for 3 h, at 300° C. for 4 h, at 320° C. for 4 h, and at 340° C. for 2 h, with a heating rate of 1° C./min during the sulfidation.

After the pre-sulfidation of the catalysts, LPG starting materials were fed when the temperature decreased to a reaction temperature, and under the condition of a temperature of 80° C., a pressure of 2.5 MPa, a volume hourly space velocity of 3.0 $h^{-1}$ and a hydrogen-to-oil volume ratio of 6, the reaction was carried out stably for 20 hours and was sampled every 5 hours for analysis.

The content of sulfides in the sample was measured using a gas chromatography-sulfur chemiluminescence detector (GC-SCD), and the conversion of sulfides was calculated. The results are listed in Table 1 (A comparison of reaction performance of the catalysts between Examples and Comparative Examples). The starting material used was LPG which was measured to have a methyl mercaptan content of 164.39 µg/g, an ethyl mercaptan content of 85.6 µg/g and a carbonyl sulfide content of 28.95 µg/g.

As can be seen from the results given in Table 1, catalysts A to H each showed a strong ability to remove methyl mercaptan and ethyl mercaptan contained in the starting materials when the starting material LPG passed through the catalyst bed at 80° C. As for the two mercaptans contained in LPG catalysts A to H prepared in the Examples showed optimal conversion efficiency for methyl mercaptan, all at 98% or more, and showed a suboptimal conversion ability for ethyl mercaptan, yet the best mercaptan conversion among which was still greater than 98%. In particular, the catalysts prepared in the Examples also showed a remarkable removing effect on a trace amount of carbonyl sulfide contained in LPG with the highest removing rate being 99% or more. The composition of the $Al_2O_3$—$SiO_2$ composite oxide carrier and the calcination temperature thereof (catalysts A to C and I) had a certain effect on the mercaptan conversion performance of the catalyst products. The catalysts prepared with $Al_2O_3$—$SiO_2$ composite oxide as the carrier showed better mercaptan conversion performance than the catalyst prepared with $Al_2O_3$ alone as the carrier, because addition of $SiO_2$ facilitates formation of Si—Al bonds so that additional acidic sites are generated, which promote low-temperature activation of mercaptans. Different calcination temperatures affect the number and intensity of acidic sites on the composite oxide carrier to different degrees, which results in difference in mercaptan conversion performance of the catalyst products.

TABLE 1

Comparison of reaction performance of the catalysts in Examples and Comparative Examples

| Examples | Catalysts | Concentration of sulfocompound in the product (μg/g) | | |
|---|---|---|---|---|
| | | Methyl mercaptan | Ethyl mercaptan | Carbonyl sulfide |
| 1 | A | 0.45 | 2.94 | 0.71 |
| 2 | B | <0.1 | 1.12 | 0.13 |
| 3 | C | 0.24 | 2.13 | 0.46 |
| 4 | D | 2.38 | 6.22 | 1.52 |
| 5 | E | 1.64 | 5.84 | 1.24 |
| 6 | F | 0.13 | 1.69 | 0.17 |
| 7 | G | 0.30 | 2.72 | 0.61 |
| 8 | H | 0.17 | 1.97 | 0.20 |
| Comparative Example 1 | I | 0.72 | 3.16 | 0.74 |
| Comparative Example 2 | J | 4.14 | 12.26 | 1.78 |
| Comparative Example 3 | K | 48.68 | 37.5 | 6.96 |

In addition, as can be seen from Table 1, the loading amounts of $V_2O_5$ and NiO, the V/Ni molar ratio, and the types of the active metal-containing starting materials all have certain effects on the mercaptan conversion efficiency of the catalysts. A low total loading amount of active metal (catalyst D) and an improper V/Ni molar ratio (catalyst E) are both unfavorable to formation of active centers, thereby decreasing the mercaptan conversion ability of catalysts. Among the catalysts in the above Examples, catalyst B showed the best mercaptan conversion performance, with a methyl mercaptan conversion of >99.9%, an ethyl mercaptan conversion of 98.69%, and a carbonyl sulfide conversion of 94.75%.

As can be seen from the evaluation results of the catalysts in the Comparative Examples, the catalyst supporting $V_2O_5$ alone and the catalyst supporting NiO alone both had reduced mercaptan conversion performance, in which the catalyst supporting $V_2O_5$ showed the worst sweetening performance with a methyl mercaptan conversion of only 70.39%, an ethyl mercaptan conversion of only 56.19% and a carbonyl sulfide conversion of only 75.96%. As such, the synergistic effect between the metals V and Ni is the key factor for a bimetallic mercaptan conversion catalyst to have superior mercaptan conversion performance.

In summary, the bimetallic mercaptan conversion catalyst prepared according to the preparation method provided in accordance with the present invention has a proper specific surface area and number of active center sites, and has advantages of simple preparation, an efficient mercaptan conversion ability even at a low temperature, and causing no saturation and polymerization of olefins. Moreover, the bimetallic mercaptan conversion catalyst exhibits superior mercaptan conversion performance, has strong adaptability to starting materials, and can also nearly completely remove trace carbonyl sulfide contained in LPG. The catalyst provided in accordance with the present invention has prominent low-temperature catalytic activity and good catalytic stability, as compared to catalysts in the prior art.

What is claimed is:

1. A method for preparing a bimetallic mercaptan conversion catalyst for sweetening liquefied petroleum gas at a low temperature, comprising the following steps:
   (1) mixing 60-80 parts by mass of aluminum hydroxide xerogel and 20-40 parts by mass of silica xerogel uniformly, adding a pore-forming agent and an aqueous nitric acid solution thereto, followed by mixing and kneading, and then extruding the resultant to produce a formed article, wherein the pore-forming agent is in an amount of 3-5 wt % with respect to the total mass of the mixture of the aluminum hydroxide xerogel and the silica xerogel, wherein the aqueous nitric acid solution is in an amount of 70-80 wt % with respect to the total mass of the mixture of the aluminum hydroxide xerogel and the silica xerogel, and wherein the aqueous nitric acid solution has a concentration of 5-10 wt %, on a mass percentage basis;
   (2) air-drying the formed article by placing it at room temperature for 8-15 hours, drying it at 90-120° C. for 3-5 hours, then calcinating it for 3-8 hours by elevating the temperature to 450-620° C. at a heating rate of 2-4° C./min, and subsequently crushing and screening the resultant to produce short-rod-like particles having a size of 4-6 mm, thereby producing an $Al_2O_3$—$SiO_2$ composite oxide carrier; and
   (3) loading bimetallic active components, vanadium and nickel, separately onto the $Al_2O_3$—$SiO_2$ composite oxide carrier by using an isometric impregnation method, and then drying and calcinating it to obtain the bimetallic mercaptan conversion catalyst for sweetening liquefied petroleum gas at a low temperature.

2. The method according to claim 1, wherein the $Al_2O_3$—$SiO_2$ composite oxide carrier has a specific surface area of 150-330 m$^2$/g and a pore size of 4-12 nm.

3. The method according to claim 1, wherein step (3) comprises:
   i) adding a solution containing a soluble salt of vanadium dropwise onto the $Al_2O_3$—$SiO_2$ composite oxide carrier, then placing it at room temperature for 6-12 hours, drying it at 90-120° C. for 3-5 hours, and calcinating it at 420-550° C. for 3-6 hours, to obtain a catalyst intermediate; and
   ii) adding a solution containing a soluble salt of nickel dropwise onto the catalyst intermediate, then placing it at room temperature for 6-12 hours, drying it at 90-120° C. for 3-5 hours, and calcinating it at 420-550° C. for 3-6 hours, to obtain the bimetallic mercaptan conversion catalyst for sweetening liquefied petroleum gas at a low temperature.

4. The method according to claim 3, wherein the soluble salt of vanadium includes one or more of ammonium metavanadate, sodium metavanadate, potassium metavanadate, vanadium acetylacetonate and sodium orthovanadate.

5. The method according to claim 3, wherein the soluble salt of nickel includes one or more of nickel nitrate, nickel chloride, nickel sulfate, nickel acetate, nickel oxalate and nickel acetylacetonate.

6. The method according to claim 1, wherein the total content of the bimetallic active components measured on the basis of the weight of oxides is 10-40 wt % of the bimetallic mercaptan conversion catalyst for sweetening liquefied petroleum gas at a low temperature.

7. The method according to claim 6, wherein the total content of the bimetallic active components measured on the basis of the weight of oxides is 12-30 wt % of the bimetallic mercaptan conversion catalyst for sweetening liquefied petroleum gas at a low temperature.

8. The method according to claim 1, wherein the molar ratio of vanadium to nickel is (0.1-0.8):1.

9. The method according to claim 1, wherein, in step (1), the extruded formed article is a clover-shaped long-rod-like formed article having a diameter of 1-3 mm or a cylindrical long-rod-like formed article having a diameter of 1-3 mm.

10. The method according to claim 1, wherein the pore forming agent is sesbania powder.

* * * * *